Dec. 4, 1945.  E. M. DONS ET AL  2,390,430
APPARATUS FOR EXTRACTING CONSTITUENTS OF MINERAL OILS
Filed June 12, 1943
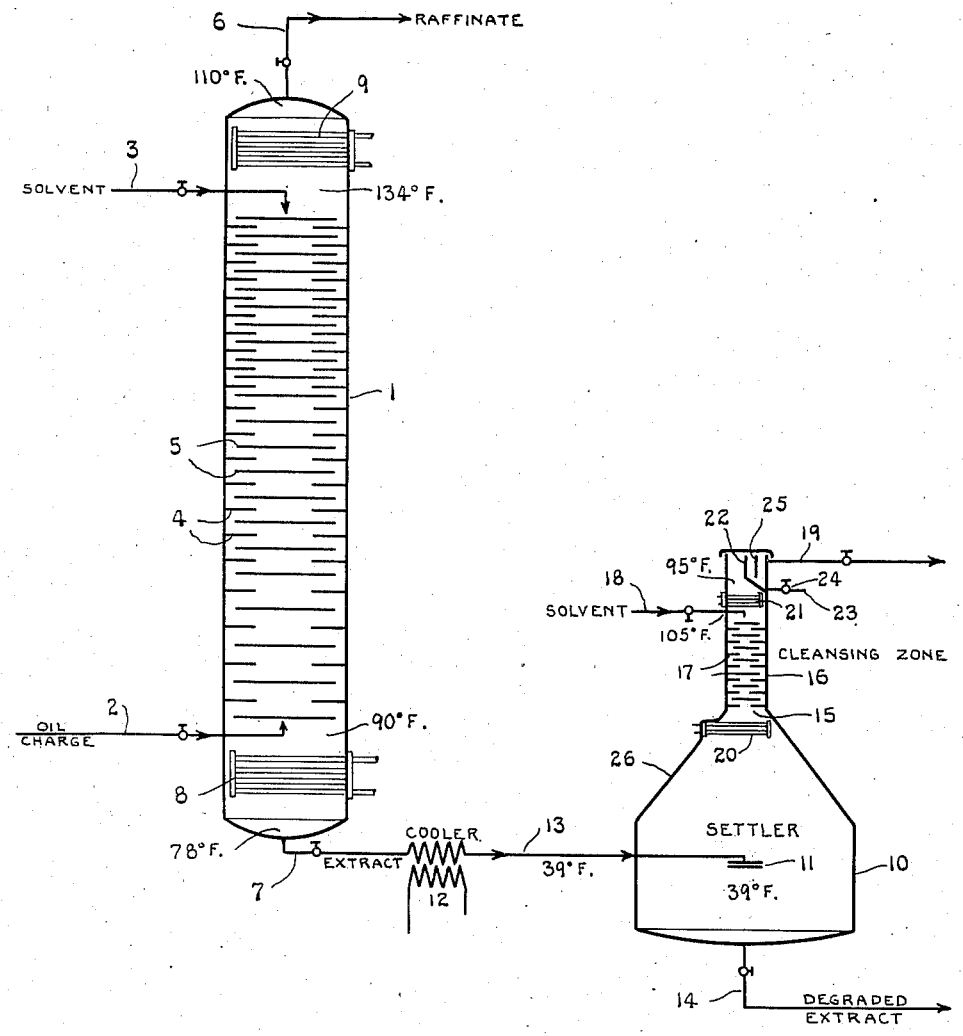
INVENTORS:
E. M. DONS
O. G. MAURO
BY McCauley & McCauley
ATTORNEYS.

Patented Dec. 4, 1945

2,390,430

UNITED STATES PATENT OFFICE 2,390,430

APPARATUS FOR EXTRACTING CONSTITUENTS OF MINERAL OILS

Eddie M. Dons and Oswald G. Mauro, Tulsa, Okla., assignors to Mid-Continent Petroleum Corporation, Tulsa, Okla., a corporation of Delaware Application June 12, 1943, Serial No. 490,697

1 Claim. (Cl. 196—46)

This invention relates to apparatus for extracting constituents of mineral oils, and more particularly to apparatus wherein selective solvents are employed to select and remove components of the oils. For example, in refining petroleum lubricating oils, various solvents have been employed to extract degrading naphthenic compounds, and the mineral oil industry includes many other examples of the use of selective solvents to extract different components from the oils.

In this old art, an outstanding problem has appeared in the difficulty of selectively obtaining an extract solution limited to the components intended to be extracted. Prior to this invention, selected portions of the extract solution have been recycled to the original extractor, and in other cases, the extract has been subjected to a series of operations in complex and expensive equipment designed to remove and recover valuable portions of the extract solutions.

The main object of the present invention is to overcome this old problem in a very simple and inexpensive manner, without requiring any objectionable recycling, and without resorting to undue expense of equipment or operating costs in recovering valuable constituents of the extract solutions.

More specifically stated, in the extraction of lubricating oil stocks, to produce high viscosity index lubricants, a process may be regarded as about 100% perfect if its extract solution is completely saturated with the undesirable naphthenes, etc., thereby excluding all of the desired raffinate from the extract. Instead of resorting to the disturbance and uncertain value of recycling, and without resorting to an elaborate series of expensive refining units, we preferably transmit the extract solution to a simple settling zone, where the solvent has ample time to approximately saturate itself with the most soluble extract compounds, thereby throwing out the less soluble and usually more valuable raffinate components, which then form part of the supernatant solution rising to the top of the settling chamber. However, despite the provision for prolonged settling and approximate saturation in the settling chamber, the rising supernatant raffinate solution will include degrading components that should form part of the extract solution.

Therefore, the outgoing mass of supernatant solution is preferably transmitted into a relatively small counterflow cleansing zone, where it is cleansed by a descending solvent which dissolves and returns objectionable constituents to the settling chamber. The cleansed or purified raffinate product is discharged from an upper portion of the relatively small cleansing zone, while the added solvent carries degrading components back into the large settling zone, where the added solvent will supplement the operation of dissolving the most degraded, or most soluble, components while ejecting the more valuable lighter compounds.

With the foregoing and other objects in view, the invention comprises the specific combination and arrangement of details herein shown and described to set forth a specific form of the invention. However, it is to be understood that the patent extends to variations and modifications within the scope of terms employed in the claim hereunto appended.

The drawing is a diagrammatical view of a system embodying features of this invention.

To illustrate one form of the invention we have shown an extracting system comprising a vertical chamber 1 which receives a continuous stream of charging stock from a supply pipe 2, and a continuous stream of selective extracting solvent from a pipe 3. In this illustration we are assuming that one of the relatively heavy solvents has been selected for the operation. Dichlorethyl ether, known as "chlorex," or any other suitable heavy or light solvent may be employed in the present invention. A relatively heavy solvent stream will descend in the chamber 1 while the lighter oil stream rises in said chamber. Numerous alternating baffles 4 and 5 may be located in said chamber 1 to repeatedly deflect the rising and descending streams into intersecting paths, thereby causing the descending solvent to selectively dissolve components of the rising oil stream.

In the manufacture of high viscosity index lubricating oil, the descending solvent will dissolve naphthenic and other degrading compounds of the rising oil stream. The resultant high quality raffinate solution is eventually discharged in a continuous stream through a pipe 6 at the top of the counterflow chamber 1, while a continuous stream of the degraded naphthenic extract solution is discharged through a pipe 7 extending from the bottom of said chamber. To illustrate a suitable means for maintaining different temperature conditions in the extracting chamber 1, we have shown a cooler 8 near the bottom of said chamber and a cooler 9 near the top. The incoming streams of solvent and charging stock may be heated before they enter the extracting chamber. Specific temperatures are indicated at various portions of the chamber 1, so as to show that such temperatures may be selectively varied to provide for relatively high efficiency in the extractor.

In commercial practice, the foregoing and other conditions are very carefully considered for the purpose of trying to produce an extract solution lacking any material percentage of the raffinate material. However, experience has shown that supplemental operations are required to separate such raffinate material from the outgoing extract solution.

Instead of resorting to the usual elaborate and expensive equipment to recover valuable components from the extract solution, we have shown just how these components can be very economically selected and removed in a single unit comprising a large settling chamber having an extension wherein a selective solvent is employed to select and return degraded components from an outgoing supernatant solution.

To illustrate one form of this invention, the drawing includes a settling chamber 10 having an inlet at 11. The stream of extract solution from the extraction system may be continuously transmitted through the pipe 7 to a cooler 12 and thence through a pipe 13 to the inlet at 11. The bottom of this settling chamber 10 has a discharge pipe 14 for a continuous stream of relatively heavy extract solution. The upper portion of said settling chamber is provided with an outlet at 15 for a continuous rising stream of the outgoing supernatant solution from the settling operation.

A counterflow cleansing compartment 16 extends upwardly from said outlet 15 to receive the rising supernatant solution. This cleansing compartment may be provided with baffles 17. A continuous stream of relatively heavy selective solvent is admitted through a pipe 18 above the baffles. For convenience, this fresh solvent may be identical with the solvent employed in the initial extracting operation. It will produce a descending solvent stream through the rising mass of lighter supernatant solution from the settling chamber, thereby selectively dissolving constituents of the supernatant solution. The descending stream flows through the outlet 15 in counterflow relation to the rising supernatant solution, so as to return its selected components to the settling chamber.

The upper portion of the cleansing compartment 16 is provided with a discharge pipe 19 for the continuous stream of cleansed supernatant solution. In the manufacture of high viscosity index lubricants, this cleansed stream will be a solution containing valuable paraffinic oil recovered from a degraded naphthenic extract, and the temperatures in the cleansing compartment may be regulated as desired for the cleansing operations. For example, the solvent stream from pipe 18 may be at a relatively high temperature, as suggested by a temperature indication on the drawing, and since the settling in chamber 10 preferably occurs at a low temperature, the system may include a heater 20 near the outlet 15 to provide for heating of waxy stocks, or other stocks wherein heating will improve the counterflow cleansing operation. Furthermore, the upper portion of the cleansing compartment may be provided with a cooler 21 to reduce the temperature of the rising solution before it escapes from said cleansing compartment.

At the upper portion of the cleansing compartment 16, we have shown a water-settling chamber 22 open at the top to receive the cleansed supernatant solution and provided with a normally closed water outlet 23 at the bottom. This outlet 23 includes a valve 24 which is opened occasionally to withdraw water settling from the outgoing solution, the latter being discharged through a pipe 19 at the upper portion of the chamber 22. A baffle plate 25 is preferably arranged in said chamber 22 as shown in the drawing.

The settling chamber 10 and its cleansing compartment 16 may be in the form of a simple and relatively inexpensive single unit, providing for a simple gravitational flow of relatively heavy components from the top of the restricted cleansing zone to the bottom of the large settling zone. Moreover, in this simple form of the invention we can provide for the desired quiescent condition in the settling zone while maintaining relatively high velocities in the counterflowing streams in the cleansing zones. The settling chamber 10 may have a large diameter to provide the cubic space for high efficiency in the desired continuous settling, regardless of velocities of the continuous streams in other parts of the extracting system. The extended clearsing compartment 16 may have a relatively small diameter in addition to the baffles 17, so as to provide restricted areas for relatively high velocities in the continuous cleansing operations, and the settling chamber 10 may have a tapering upper wall 26 converging toward the cleansing compartment to provide for gradual changes in velocity.

We claim:

In an apparatus for extracting constituents of waxy lubricating oils, including a counterflow extractor wherein a selective solvent is employed to separate a relatively heavy naphthenic extract solution from a lighter waxy, paraffinic raffinate solution, said extractor having an outlet for the separated extract solution, the means for recovering a second waxy paraffinic raffinate from said extract solution which comprises a large settling chamber wherein all of the waxy paraffinic components of the second raffinate are selectively separated from the extract solution, means for cooling said extract solution to produce a relatively low temperature condition in the settling chamber, said settling chamber having an inlet communicating with said outlet for the separated extract solution, the lower portion of said settling chamber having an outlet for relatively heavy extract solution, the upper portion of said settling chamber being provided with an outlet for a rising stream of outgoing waxy paraffinic raffinate solution from the settling operation, a heater located near the top of said settling chamber to heat the outgoing waxy stream, said settling chamber being large enough to maintain a large body of the extract solution in a quiescent condition for a period sufficient to selectively separate all of the paraffinic components of said second waxy raffinate from the relatively heavy extract solution in said settling chamber, and means for dissolving and returning degrading components of said outgoing raffinate solution to said large settling chamber, said means including a much smaller counterflow cleansing compartment extending upwardly from the outlet at the upper portion of said settling chamber to receive the rising paraffinic raffinate solution and a descending stream of cleansing solvent, said extended compartment having an inlet for the cleansing solvent and an outlet for the second raffinate solution, and the outlet at the upper portion of said settling chamber being in direct communication with the bottom of said upwardly extended cleansing compartment to provide for upward discharge of the second paraffinic raffinate solution and downward return of said degrading components.

EDDIE M. DONS.
OSWALD G. MAURO.